United States Patent [19]

Furukawa et al.

[11] Patent Number: 4,647,058

[45] Date of Patent: Mar. 3, 1987

[54] STEERING MECHANISM FOR MOTOR VEHICLES

[75] Inventors: Yoshimi Furukawa, Tochigi; Shoichi Sano, Tokyo, both of Japan

[73] Assignee: Honda Giken Kogyo Kabushiki Kaisha, Tokyo, Japan

[21] Appl. No.: 681,509

[22] Filed: Dec. 14, 1984

[30] Foreign Application Priority Data

Dec. 16, 1983 [JP] Japan ................................ 58-237323

[51] Int. Cl.[4] ............................................ B62D 7/00

[52] U.S. Cl. .......................................... 280/91; 74/409

[58] Field of Search ..................... 280/91, 99; 180/140; 74/31, 392, 409

[56] References Cited

U.S. PATENT DOCUMENTS 4,158,315 6/1979 Kensrue et al. ......................... 74/31

4,506,899 3/1985 Sono et al. ............................ 280/91

FOREIGN PATENT DOCUMENTS 97565 6/1983 Japan .................................... 280/91

*Primary Examiner*—John J. Love

*Assistant Examiner*—Ross Weaver

*Attorney, Agent, or Firm*—Irving M. Weiner; Joseph P. Carrier; Pamela S. Burt

[57] ABSTRACT

A steering mechanism in a motor vehicle having front and rear wheels steerable in response to steering operation of a steering wheel. An input shaft rotatable about its own axis in response to steering operation of the steering wheel has an eccentric shaft mounted on a rear end of the input shaft. A tubular member is rotatably fitted over the eccentric shaft and has an integral pinion and an integral eccentric cam. An internal gear disposed in fixed relationship to a vehicle body of the motor vehicle is held in meshing engagement with the pinion. A pair of tie rods supporting the rear wheels, respectively, is interconnected by a joint member rotatably mounted on the eccentric cam.

6 Claims, 7 Drawing Figures

1
2
3
4
5
6
7
8
9
10
11
12
20
24
26
43
50
53
61
67
68
69
72
73
74

69
72
68
67
66
53
71
54
62
65
61
55
43
26
21
31
27
22
24
20
12
50
72

14
51
B
42b
A
42
C
D

III'
53
54
56
50
61
62
65
63
L 24
24a
29
27
31
26
41
14
B
33
28
III
28a
A
25
21
24a
24
29
III 32
33
34
34a
35

STEERING MECHANISM FOR MOTOR VEHICLES

BACKGROUND OF THE INVENTION

1. Field of the Invention:

The present invention relates to a steering mechanism in motor vehicles for steering front and rear wheels in response to operation of a steering wheel.

2. Description of the Prior Art:

There are known various steering systems for motor vehicles for steering front and rear wheels in the same direction when a steering wheel is turned through a small steering angle and for steering front and rear wheels in opposite directions when the steering wheel is turned through a large steering angle. Such steering systems can improve the driving characteristics of the motor vehicle when the steering angle is relatively small while the motor vehicle is running, and also can improve the maneuverability of the motor vehicle when the steering angle is relatively large such as when the motor vehicle is turned in a garage or a parking lot. One such steering system is disclosed in Japanese Patent Laid-Open Print No. 58-97565 published on June 10, 1983.

The above Laid-Open Print discloses a vehicle steering system including a rear wheel steering mechanism having an input shaft angularly movable in response to operation of a steering wheel. An arm extends radially from the input shaft and supports on a distal end thereof a pinion in an axial direction of the input shaft, the pinion being held in meshing engagement with an internal gear fixed to a vehicle body. The pinion has an integral crank pin connected to tie rods for rear wheels.

The steering system thus employs a planetary gear mechanism comprising the pinion and the internal gear. When the pinion revolves around the center of the internal gear through a small angle, the direction of lateral movement of the crank pin due to rotation of the pinion about its own axis is opposite to the direction of lateral movement of the crank pin due to revolution of the pinion around the center of the internal gear, so that the total lateral displacement of the crank pin is small. When the angle of revolution of the pinion around the center of the internal gear becomes larger, the direction of lateral movement of the crank pin due to rotation of the pinion about its own axis is the same as the direction of lateral movement of the crank pin due to revolution of the pinion around the center of the internal gear, with the result that the overall lateral displacement of the crank pin is reversed in direction with respect to a vertical plane including an axis of the input shaft and increased. Therefore, since the maximum steering angle of the rear wheels, as they are steered in a direction opposite to that in which the front wheels are steered, can be greater than the maximum steering angle of the rear wheels as they are steered in the same direction as that in which the front wheels are steered, the driving characteristics of the vehicle are improved when the vehicle is steered through a relatively small steering angle, and a smaller radius of turning movement of the vehicle is obtained and the maneuverability thereof is improved when the vehicle is steered through a relatively large steering angle.

With the above prior-art steering system, the pinion is supported in an eccentric relation to the input shaft and the crank pin is integral with the pinion. As a consequence, the crank pin is also displaced radially off the input shaft across a large interval. The input mechanism therefore has a large moment and hence is required to have a rigidity and a strength sufficient to withstand the increased moment. For this reason, the input mechanism cannot be made more compact beyond a certain limit.

SUMMARY OF THE INVENTION

According to the present invention, there is provided a steering mechanism in a motor vehicle having a vehicle body and front and rear wheels steerable in response to steering operation of a steering wheel, the steering mechanism comprising an input shaft rotatable about its own axis in response to steering operation of the steering wheel, an eccentric shaft mounted on a rear end of the input shaft, a tubular member rotatably fitted over the eccentric shaft and having an integral pinion and an integral eccentric cam, an internal gear disposed in fixed relationship to the vehicle body and held in meshing engagement with the pinion, a pair of tie rods supporting the rear wheels, respectively, and a joint member interconnecting the tie rods and rotatably mounted on the eccentric cam.

The steering mechanism includes a bearing holder fixed to the vehicle body and supporting the input shaft rotatably therein, the internal gear having on an axial end thereof a flange coupled to the bearing holder. The internal gear is slightly movable with respect to the bearing holder by means of an eccentric bolt extending through the flange and the bearing holder. The bearing holder has stoppers disposed against respective surfaces of the flange which are spaced transversely of the vehicle body for limiting transverse movement of the internal gear.

Accordingly, it is an object of the present invention to provide a steering mechanism for motor vehicles which includes a planetary gear mechanism comprising a pinion and an internal gear, an eccentric shaft displaced radially off an input shaft across a reduced interval, and an input mechanism subjected to a reduced moment and having a relatively compact size.

Another object of the present invention is to provide a steering mechanism for motor vehicles which is capable of adjusting the backlash or lost motion between a pinion and an internal gear.

Still another object of the present invention is to provide a steering mechanism for motor vehicles which is capable of reliably withstanding a transverse force imposed on an internal gear.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
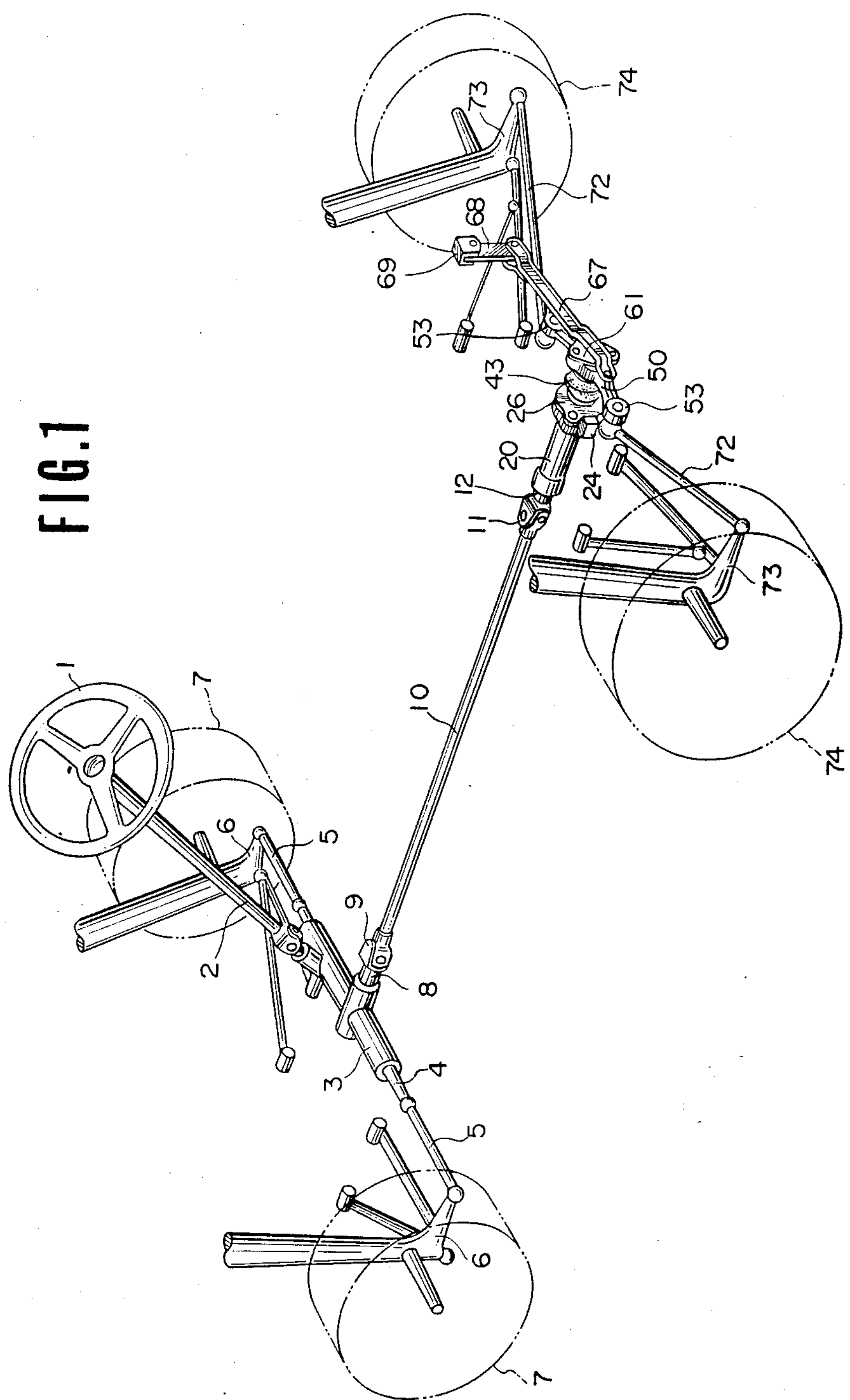
FIG. 1 is a schematic perspective view of a steering mechanism for a motor vehicle according to the present invention.

As shown in FIG. 1, a steering wheel 1 has a steering shaft 2 operatively coupled with a rack-and-pinion gear box 3 having a rack shaft 4 having lateral ends connected to inner ends of tie rods 5, 5, respectively. To outer ends of the tie rods 5, 5 there are connected respective knuckle arms 6, 6 supporting front wheels 7, 7, respectively, which can be angularly moved or steered in directions in which the steering wheel 1 is turned A pinion shaft 8 extends rearwardly from the gear box 3 and has a rear end coupled by a universal joint 9 to an elongated linkage shaft 10 with its rear end coupled by a universal joint 11 to an input shaft 12 of a rear steering system, the input shaft 12 being positioned in alignment with a longitudinal central line of a rear vehicle body section.

Figure 3:
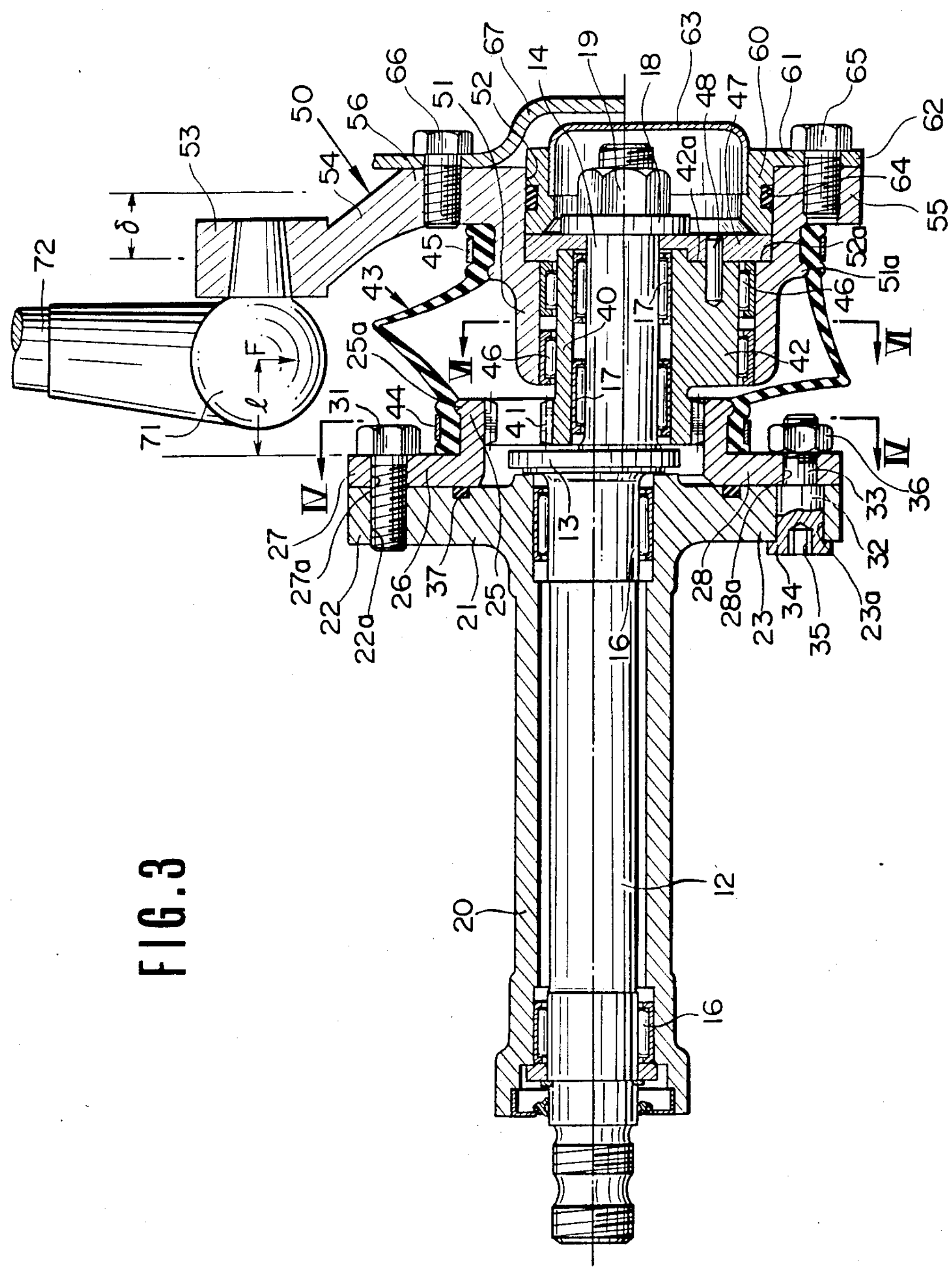
FIG. 3 is a developed cross-sectional view of an input mechanism, the view being composed of a view taken along line III—III of FIG. 4 and a view taken along line III'—III' of FIG. 7.

As illustrated in FIG. 3, the input shaft 12 is rotatably supported by a pair of front and rear needle bearings 16, 16 in a tubular bearing holder 20 fixedly supported on the vehicle body by a bracket, not shown. The input shaft 12 has on a rear end thereof a largerdiameter portion 13 disposed out of the bearing holder 20 and having an eccentric shaft 14 projecting rearwardly therefrom.

The bearing holder 20 has on a rear end thereof a thick flange 21 having a rear surface against which there is held a flange 26 on a front end of a ring gear 25 which comprises an internal gear. The ring gear 25 is fastened to the bearing holder 20 by two bolts 31, 31 (FIG. 4), an eccentric bolt 32, and a nut 36 threaded thereover, the bolts 31, 32 threadedly engaging the flanges 21, 26. A seal ring 37 is interposed between the flanges 21, 26.

A tubular member 40 having an integral pinion 41 on a front end thereof and an integral circular eccentric cam 42 on a rear end thereof is rotatably supported on the eccentric shaft 14 by a pair of front and rear needle bearings 17, 17. The pinion 41 is held in meshing engagement with the ring gear 25. The pinion 41 and the ring gear 25 jointly constitute a planetary gear mechanism.

The ring gear 25 has an annular ridge **25*a* on a rear outer periphery thereof. A flexible rubber boot 43 has a front end fitted over an outer periphery of the ring gear 25 and retained firmly thereon by a ring band or strap 44**.

Figure 2:
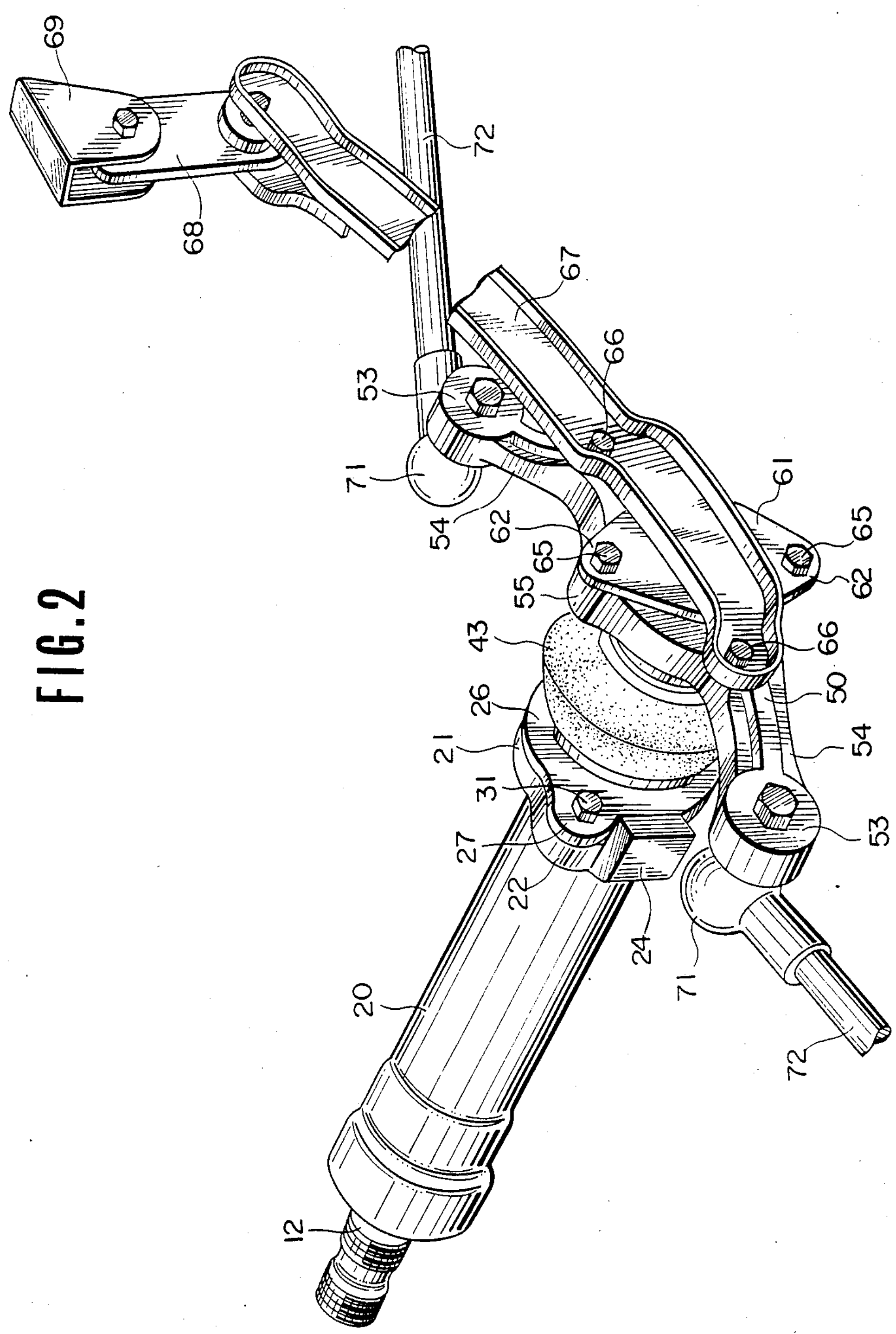
FIG. 2 is an enlarged perspective view of a rear wheel steering system.

Referring to FIGS. 2 and 3, a joint member 50 includes a transversely central tubular portion 51 projecting forwardly and rotatably fitted over the eccentric cam 42 by a pair of front and rear needle bearings 46, 46. The joint member 50 has a central circular recess 52 defined rearwardly of the tubular member 51 and having a step or shoulder **52*a*. A thrust bearing plate 47 is placed against the step 52*a* and a rear surface 42*a* of the eccentric cam 42, and secured to the eccentric cam 42 by a knock pin 48. The thrust bearing plate 47 is loosely fitted over the eccentric shaft 14**.

Figure 7:
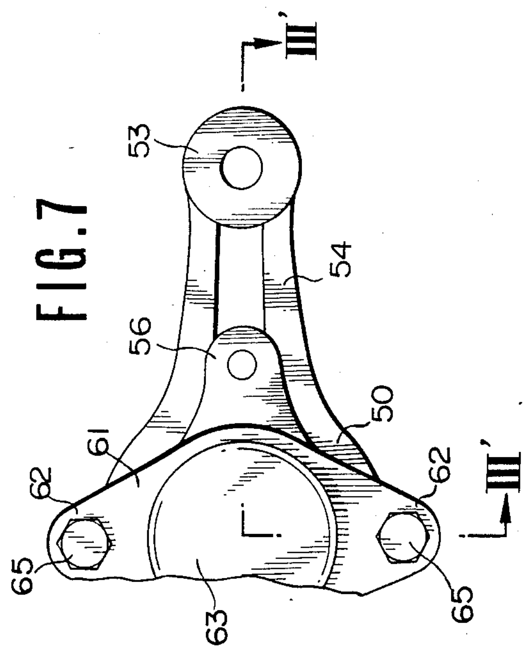
FIG. 7 is a fragmentary rear elevational view of a joint member.

The eccentric shaft 14 has an externally threaded rear end 15 over which a nut 19 is threaded with a washer 18 interposed between the thrust bearing plate 47 and the nut 19. A sleeve 60 is fitted in the central circular recess 52 in the joint member 50 and has on a rear end thereof a vertically elongated flange 61 (FIG. 7) fastened by two bolts 65, 65 to a rear central surface of the joint member 50. A cap 63 is fitted in a rear end of the sleeve 60 to cover the circular recess 52. A seal ring 64 is interposed between the sleeve 60 and an inner wall surface defining the circular recess 52.

The tubular portion 51 has an annular ridge **51*a* on an outer periphery near a rear end thereof. The rubber boot 43 has a rear end fitted over a rear outer peripheral portion of the tubular portion 51 and fastened thereto by a ring band or strap 45. The rubber boot 43 thus sealingly covers the parts between the ring gear 25 and the joint member 50**.

The input mechanism for the rear wheel steering system is assembled as described above. A transverse arm 67 has an end portion fastened by two transversely spaced bolts 66, 66 to the rear central surface of the joint member 50. To the other end of the arm 67, there is pivotably coupled a link 68 pivotably supported on a bracket 69 fixed to the vehicle body. The joint member 50 is kept horizontal by the arm 67 and the link 68 which are angularly movable.

The joint member 50 is of a transversely elongated configuration having opposite ends 53, 53 on forwardly bent portions 54, 54, respectively, the ends 53, 53 supporting front ball joints 71, 71, respectively, to which inner ends of rear-wheel tie rods 72, 72 are coupled. Knuckle arms 73, 73 supporting rear wheels 74, 74 are connected respectively to outer ends of the tie rods 72, 72.

Figure 6:
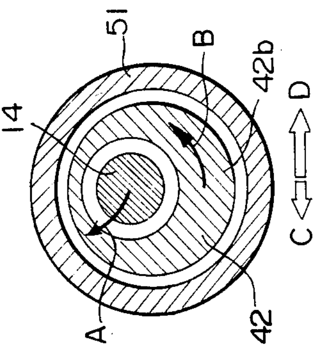
FIG. 6 is a cross-sectional view taken along line VI—VI of FIG. 3.
Figure 4:
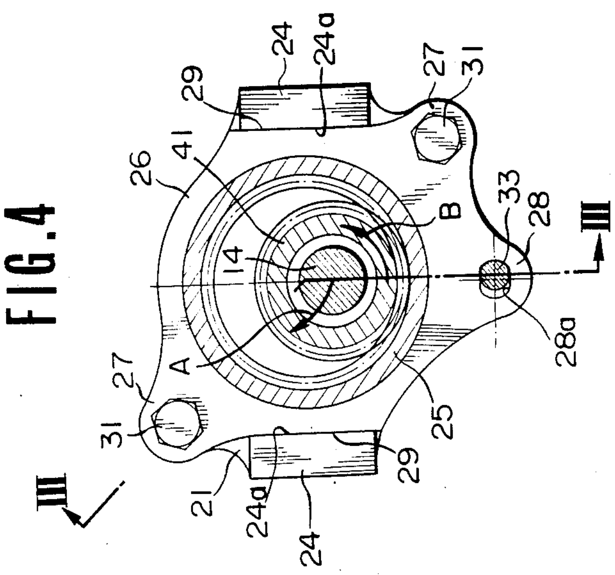
FIG. 4 is a cross-sectional view taken along line IV—IV of FIG. 3.

The input mechanism of the above construction is initialized by, as shown in FIGS. 4 and 6, positioning the eccentric shaft 14 vertically below the input shaft 12 so that the pinion 41 meshes with the ring gear 25 at a lowest portion thereof. At this time, a highest cam portion **42*b* of the eccentric cam 42 is directed vertically downwardly. The pinion shaft 8 has a pinion, not shown, on a front end thereof disposed over the rack shaft 4 in the gear box 3 and held in direct meshing engagement with the rack shaft 4**.

Operation of the steering mechanism will be described with reference to FIGS. 4 and 6. When the input shaft 12 is turned about its own axis in response to steering action of the steering wheel 1, the eccentric shaft 14 is angularly moved in the direction of the arrow A, for example, in FIG. 4. Although the pinion 41 rotatably fitted over the eccentric shaft 14 and meshing with the fixed ring gear 25 revolves around the central axis of the input shaft 12 in the direction of the arrow A, the pinion 41 rotates about its own axis in the direction of the arrow B which is opposite to the direction of the arrow A. Therefore, as shown in FIG. 6, the eccentric cam 42 integral with the pinion 41 is also rotated about the eccentric shaft 14 in the direction of the arrow B. Since the direction of transverse movement of the eccentric shaft 14 with respect to the input shaft 12 is opposite to the direction of transverse movement of the highest cam portion **42*b* of the eccentric cam 42 with respect to the input shaft 12, the total transverse displacement which is equal to the difference in the transverse movements of the eccentric shaft 14 and the highest cam portion 42*b* of the eccentric cam 42 is rendered small as indicated by the arrow C in FIG. 6. Thus, the maximum transverse displacement of the joint member 50 rotatably fitted over the eccentric cam 42** is small, reducing the maximum steering angle of the rear wheels 74, 74 as they are steered through the tie rods 72, 72 in the same direction as that in which the front wheels 7, 7 are steered.

When the angle of revolution of the pinion 41 about the central axis of the input shaft 12 exceeds a prescribed angle, the direction of transverse movement of the eccentric shaft 14 with respect to the input shaft 12 comes to coincide with the direction of transverse movement of the highest cam portion 42*b* of the eccentric cam 42. Therefore, the total transverse displacement which is the sum of the above transverse movements is reversed in direction with respect to a vertical plane including an axis of the input shaft 12 and increased as indicated by the arrow D in FIG. 6. The maximum lateral displacement of the joint member 50 is thus increased to increase the maximum steering angle of the rear wheels 74, 74 as they are steered in a direction opposite to that in which the front wheels 7, 7 are steered.

Therefore, since the maximum steering angle of the rear wheels 74, 74 as they are steered in a direction opposite to that in which the front wheels 7, 7 are steered can be greater than the maximum steering angle of the rear wheels 74, 74 as they are steered in the same direction as that in which the front wheels 7, 7 are steered, the driving characteristics of the vehicle is improved when the vehicle is steered through a relatively small steering angle, and a smaller radius of turning movement of the vehicle is obtained and the maneuverability thereof is improved when the vehicle is steered through a relatively large steering angle.

As described above, the input mechanism of the rear wheel steering system is primarily arranged such that the tubular member 40 having the eccentric cam 42 integral with the pinion 41 is rotatably fitted over the eccentric shaft 14 on the input shaft 12, and the joint member 50 is rotatably fitted over the eccentric cam 42. Therefore, the offset interval of the joint member 50 with respect to the input shaft 12 can be reduced to minimize the moment of the input mechanism. As the input mechanism is constructed on the eccentric shaft 14 on the rear end of the input shaft 12, the input mechanism has a small axial length and hence is rendered compact in size.

Inasmuch as the tubular member 40 and the the joint member 50 are assembled as a double-walled construction on the eccentric shaft 14, they can easily be replaced with new components. Since the tubular member 40 includes the pinion 41 and the eccentric cam 42 which are axially integrally formed, the axial interval or span between the bearings 17, 17 interposed between the eccentric shaft 14 and the tubular member 40 is sufficiently large to support the tubular member 40 stably and reliably.

An arrangement for adjusting a backlash or lost motion between the pinion 41 and the ring gear 25 will now be described.

As illustrated in FIG. 4, the flange 26 of the ring gear 25 has a pair of diametrically opposite attachment tongues 27, 27 projecting obliquely upwardly and downwardly, respectively, and having bolt insertion holes 27*a*, 27*a* (FIG. 3) dimensioned to be slightly greater than an outside diameter of the bolts 31, and a tongue 28 projecting centrally downwardly and having an adjustment hole 28*a*. The flange 26 also has a pair of transversely spaced vertical flat surfaces 29, 29.

The flange 21 of the bearing holder 20 has a pair of attachment tongues 22, 22 (only one shown in FIG. 3) and a tongue 23, which are axially aligned respectively with the tongues 27, 28 of the flange 26. The attachment tongues 22, 22 have internally threaded holes 22*a*, 22*a*, and the tongue 23 has a bolt insertion hole 23*a*, as shown in FIG. 3. The flange 21 also has a pair of thick integral stoppers 24, 24 transversely spaced from each other and projecting rearwardly, the stoppers 24, 24 having vertical flat inner surfaces 24*a*, 24*a*, respectively, held against the flat surfaces 29, 29 of the flange 26, as shown in FIG. 4.

Figure 5:
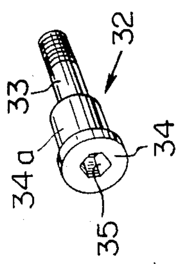
FIG. 5 is a perspective view of an eccentric bolt.

The eccentric bolt 32 extends through the bolt insertion holes 28*a*, 23*a*. As depicted in FIG. 5, the eccentric bolt 32 comprises an eccentric pin 33 having an externally threaded end portion and a head 34 having a hexagonal socket 35 defined therein and including a barrel 34*a*. The bolt insertion hole 28*a* has a vertical dimension substantially equal to an outside diameter of the pin 33 of the eccentric bolt 32 at the time the ring gear 26 is attached, and a transverse dimension greater than the outside diameter of the pin 33 so that the offset interval of the pin 33 can be absorbed or accommodated. Thus, the bolt insertion hole 28*a* is transversely elongated in shape. The bolt insertion hole 23*a* is dimensioned so as to be substantially equal to an outside diameter of the barrel 34*a* of the head 34 of the eccentric bolt 32.

In assembly, the paired attachment tongues 22, 27 and 22, 27 of the flanges 21, 26 are assembled together by loosely threading the bolts 31, 31 forwardly into the holes 27*a*, 22*a*, inserting the eccentric bolt 32 rearwardly into the holes 23*a*, 28*a* in the tongues 23, 28, as shown in FIG. 3, so that the eccentric pin 33 is positioned in the adjustment hole 28*a*, and then loosely threading the nut 36 over the externally threaded end portion of the eccentric pin 33. Then, the eccentric bolt 32 is slowly turned by means of an Allen wrench fitted in the hexagonal socket 35 to cause the eccentric pin 33 engaging in the horizontally oblong hole 28*a* to move the ring gear 25 integral with the flange 26 slightly in a vertical direction, thus adjusting any backlash or lost motion between the ring gear 25 and the pinion 41. After the backlash adjustment, the bolts 1, 31 and the nut 36 are tightened.

While the rear wheels 74, 74 are being steered, the tie rods 72, 72 moving tranversely impose a transverse force especially on the ring gear 25. With the present invention, the stoppers 24, 24 of the flange 21 are effective in bearing such a transverse force acting on the flange 26 integral with the ring gear 25. Such an arrangement, together with the fact that the bolts 31, 31, 32 are vertically spaced, enables the bearing holder 20 fixed to the vehicle body to withstand the applied transverse force reliably. Consequently, any shearing force acting on the bolts 31, 31, 32 due to the applied transverse force can be reduced.

Since the bolt 32 and the nut 36 are disposed outside of the rubber boot 43, the backlash adjustment can easily be carried out after the rubber boot 43 has been assembled in place.

It is difficult to effect direct sealing between the ring gear 25 and the joint member 50 since they tend to slide against each other during operation. However, the flexible rubber boot 43 extending between the ring gear 25 and the joint member 50 can provide an effective seal therebetween while allowing them to move relative to each other.

In order to limit forward axial movement of the joint member 50, the vertically elongated flange 61 of the sleeve 60 fitted in the circular recess 52 has a pair of vertically spaced wings 62, 62 (FIGS. 2 and 7) fastened by the bolts 65, 65 to vertically extending central projections 55, 55 of the joint member 50, and the arm 67 is coupled by the bolts 66, 66 to transversely extending projections 56, 56 (only one shown in FIG. 7) of the joint member 50. Since the flange 61 and the arm 67 are coupled to the joint member 50 at 90°-spaced positions, the flange 61 and the arm 67 can be fastened or detached easily without mutual interference.

As shown in FIG. 3, because the ends 53 of the joint member 50 are displaced forwardly by the bent portions 54, 54 by an offset interval δ, and the ball joints 71 connected to the tie rods 72 are supported by and disposed forwardly of the ends 53, the distance l between the rear surface of the flange 26 of the ring gear 25 and the center of the ball joint 71 is shortened. This arrangement can minimize any moment (M=Fl) acting on the fixed flange 26 from the ball joint 71 based on a force F applied by each of the tie rods 72 while the rear wheels 74, 74 are being steered.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A steering mechanism in a motor vehicle having a vehicle body and front and rear wheels steerable in response to steering operation of a steering wheel, comprising:

(a) an input shaft rotatable about its own axis in response to steering operation of the steering wheel;

(b) an eccentric shaft mounted on a rear end of said input shaft;

(c) a tubular member rotatably fitted over said eccentric shaft and having an integral pinion and an integral eccentric cam;

(d) an internal gear disposed in fixed relationship to said vehicle body and held in meshing engagement with said pinion;

(e) a pair of tie rods supporting the rear wheels, respectively; and (f) a joint member interconnecting said tie rods and rotatably mounted on said eccentric cam.

2. A steering mechanism according to claim 1, further including a bearing holder fixed to said vehicle body and supporting said input shaft rotatably therein, said internal gear having on an axial end thereof a flange coupled to said bearing holder.

3. A steering mechanism according to claim 2, wherein said internal gear is slightly movable with respect to said bearing holder by means of an eccentric bolt extending through said flange and said bearing holder.

4. A steering mechanism according to claim 2, wherein said bearing holder has stoppers disposed against respective surfaces of said flange which are spaced transversely of the vehicle body for limiting transverse movement of said internal gear.

5. A steering mechanism according to claim 3, wherein said flange of said internal gear has a hole through which said eccentric bolt extends, said hole having, at the time said internal gear is assembled in place, a vertical dimension substantially equal to an outside diameter of an eccentric portion of said eccentric bolt and a transverse dimension larger than the outside diameter of said eccentric portion so that said hole can accommodate a transverse offset interval of said eccentric portion.

6. A steering mechanism according to claim 1, further including an arm extending transversely of said vehicle body and having an end thereof coupled pivotably to said vehicle body by a link and an opposite end fixedly connected to said joint member.

* * * * *

UNITED STATES PATENT AND TRADEMARK OFFICE
CERTIFICATE OF CORRECTION

PATENT NO. : 4,647,058

DATED : March 3, 1987

INVENTOR(S) : Yoshimi FURUKAWA et al

It is certified that error appears in the above-identified patent and that said Letters Patent are hereby corrected as shown below:

Column 3, line 18, after "turned" insert a period.
Column 3, line 30, change "largerdiameter" to --larger-diameter--.
Column 5, line 26, after "vehicle" change "is" to --are--.
Column 6, line 18, change "26" to --25--.
Column 6, line 41, change "1,31" to --31,31--.

Signed and Sealed this

Eleventh Day of August, 1987

*Attest:*

DONALD J. QUIGG

*Attesting Officer* *Commissioner of Patents and Trademarks*